US007631806B2

(12) United States Patent
Wallerstorfer et al.

(10) Patent No.: US 7,631,806 B2
(45) Date of Patent: Dec. 15, 2009

(54) ACCESS CONTROL SYSTEM

(75) Inventors: Kurt Wallerstorfer, Irrsdorf (AT); Gregor Ponert, Salzburg (AT)

(73) Assignee: SkiData AG, Gartenau (AT)

( * ) Notice: Subject to any disclaimer, the term of this patent is extended or adjusted under 35 U.S.C. 154(b) by 418 days.

(21) Appl. No.: 11/216,338

(22) Filed: Aug. 31, 2005

(65) Prior Publication Data

US 2006/0124734 A1 Jun. 15, 2006

(30) Foreign Application Priority Data

Dec. 10, 2004 (DE) ...................... 10 2004 059 608

(51) Int. Cl.
*G06K 5/00* (2006.01)

(52) U.S. Cl. ...................... 235/382; 235/462.01; 705/1; 705/75; 382/100; 382/118; 340/573.4

(58) Field of Classification Search ................. 235/382, 235/462.01; 705/1, 75; 382/100, 118; 340/573.4
See application file for complete search history.

(56) References Cited

U.S. PATENT DOCUMENTS

| | | | | |
|---|---|---|---|---|
| 5,095,196 | A | 3/1992 | Miyata | |
| 6,038,333 | A * | 3/2000 | Wang | 382/118 |
| 6,801,907 | B1 * | 10/2004 | Zagami | 707/3 |
| 7,076,083 | B2 * | 7/2006 | Blazey | 382/100 |
| 7,159,778 | B1 * | 1/2007 | Kochevar et al. | 235/462.01 |
| 2005/0171787 | A1 * | 8/2005 | Zagami | 705/1 |
| 2005/0179553 | A1 * | 8/2005 | Fujie | 340/573.4 |
| 2006/0167833 | A1 * | 7/2006 | Wallerstorfer | 707/1 |
| 2008/0240686 | A1 * | 10/2008 | Nagaya et al. | 386/124 |

FOREIGN PATENT DOCUMENTS

| | | | |
|---|---|---|---|
| JP | 2002163740 | * | 6/2002 |
| WO | WO 96/07150 | | 3/1996 |
| WO | WO 02/35410 A2 | | 5/2002 |

OTHER PUBLICATIONS

German Patent Office Search Report dated Feb. 24, 2005 (2 pages).

* cited by examiner

*Primary Examiner*—Allyson N Trail
(74) *Attorney, Agent, or Firm*—Flynn, Thiel, Boutell & Tanis, P.C.

(57) ABSTRACT

At an access control device (1) with a reading device (4) for data carriers (8), on which access authorization and identification details are stored, a camera (7) is envisaged that takes digitized photographs of the users of the access control device (1), which are then stored in a database (9) together with the identification details read from the data carrier (8) by the reading device (4). An official (15) operates a terminal with a screen (12) that communicates with the database (9), through which the identification details on the data carrier (8) are verified, and to which the stored photograph of the user of the data carrier (8), taken by the camera (7) during access to the access control device (1) by the user, is transmissible for visual comparison with the user being checked (16).

19 Claims, 1 Drawing Sheet

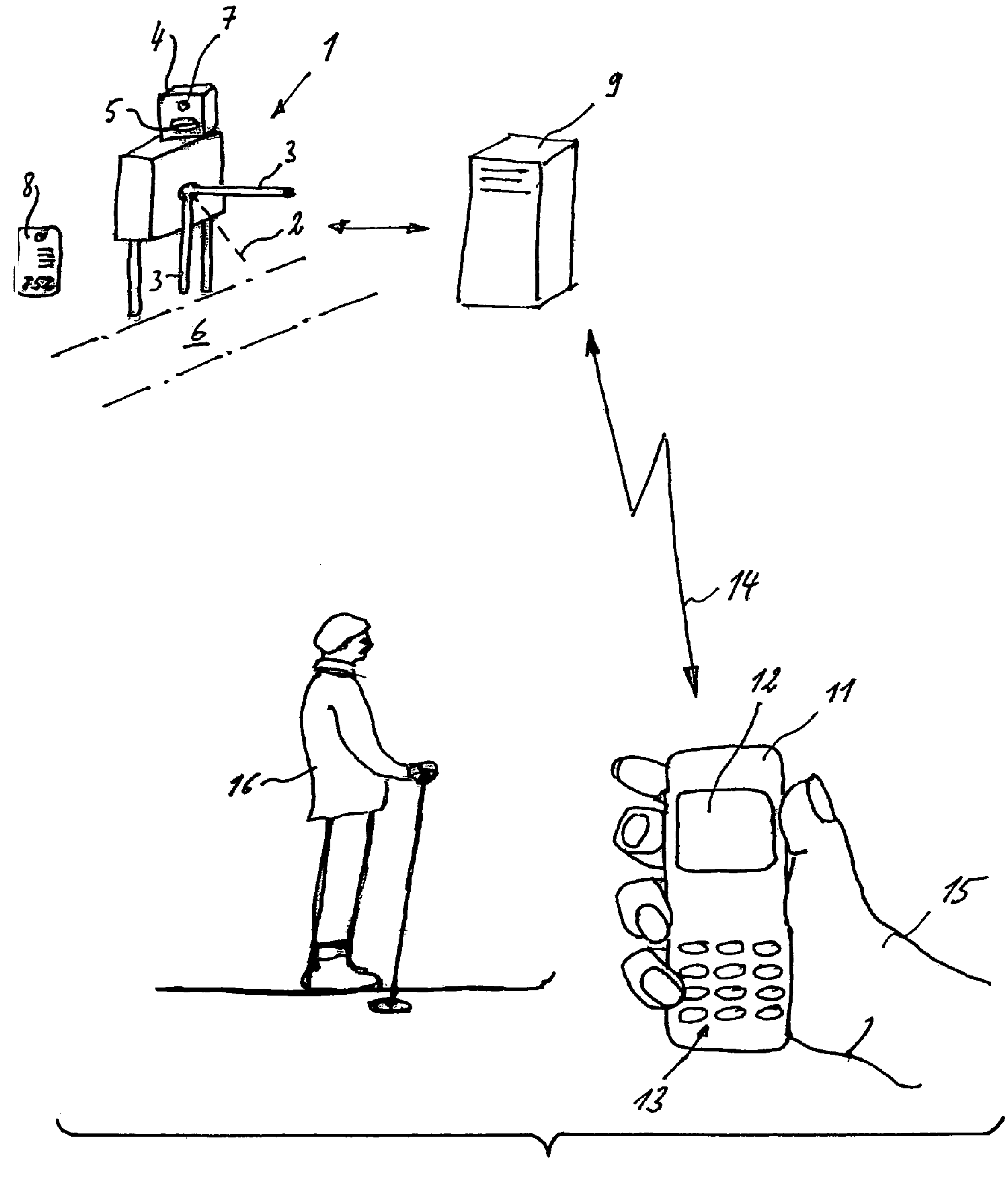
FIGURE

ACCESS CONTROL SYSTEM

FIELD OF THE INVENTION

The invention relates to a system comprising at least one access control device with a reading device for data carriers, upon which access authorization and identification details are stored.

BACKGROUND OF THE INVENTION

Systems for access control are used, for example, at cable railways and ski lifts. Especially for winter sports, day, week, and season passes and similar long-term entitlements are issued in addition to single-trip tickets, often for a multiplicity of cable railways and ski lifts that are present within entire regions. Considerable price reductions are granted for the longer-term access authorizations compared with individual trips, but these are not transferable to other users.

The unauthorized transfer of longer-term passes is, however, a widespread practice. It often happens, for example, that a skier who has bought a day pass early in the morning stops skiing around midday and then hands on the pass to a friend, or perhaps even to a stranger, e.g. in the parking lot. Lift operators incur considerable financial losses as a result of this practice. In order to prevent such transfers, an identification photo of the purchaser is therefore taken and affixed to the pass when it is purchased, so that the official can compare the photo on the pass with the person who is using it. Processing the photos and affixing them to the passes is costly and time-consuming, however, so that this is feasible only for higher-value passes, such as weekly or seasonal passes.

Also well known is the technique of storing a digitized picture of the purchaser of the pass, along with the identification details for the particular pass, in a database, and providing a device with a display screen at the point of access, to which the picture of the passholder is transmitted from the database upon input of the identification details on the pass by the official and displayed on the screen, whereby the official can compare the access user with the image on the screen. However, this method of checking is time-consuming.

SUMMARY OF THE INVENTION

The purpose of the invention is to prevent the misuse of non-transferable access authorization data carriers.

According to the invention, this is achieved by means of the system described herein.

According to the invention, the system features one of more access control devices. It can therefore involve any equipment for controlling personal access, such as turnstiles, photoelectric barriers, and the like. A reading device, which permits access upon reading a valid access authorization, is located at the access control device; it could, for example, control the motor of a motor-actuated turnstile, allowing the user of the data carrier to pass through the turnstile. The reading device can be a contact-type reading device, e.g. for barcoded, magnetic, of chipcard data carriers, or a non-contact reading device, such as an RFID transponder. The access authorization can also be stored in the user's mobile phone. The access authorization can be imprinted on, or stored within, the data carrier at a ticket office at the time of purchase, for example.

The data carrier is provided with identification details, which constitute an unambiguous reference or identification for that particular data carrier. This can consist of visual data, e.g. alphanumeric data printed on the pass, such as the name of the purchaser of the data carrier. The identification details can also be in the form of a barcode, of recorded on a magnetic card or chipcard. For cards with a chip, i.e. contact-type chipcards or RFID transponders, the identification details can also be the serial number of the chip, for example. The identification details can also be identical with the access authorization data, provided the latter constitute an unambiguous identification.

In order to release the access control device and pass it, the user must have an access authorization. To this end, access authorization can be assigned to the identification details that are stored on the data carrier. the access authorization can be stored together with the identification details on the data carrier. However, it is also possible for the access authorization to be stored in a database, whereby the identification details on the data carrier provide a reference for the readout of the access authorization from the database.

Additional features and advantages according to the present invention will be evident upon review of the following description and study of the accompanying drawings

BRIEF DESCRIPTION OF THE DRAWING

The single drawing FIGURE shows a system according to the present invention for ensuring access authorization of a user.

DETAILED DESCRIPTION

With the system according to the invention, access to any venues such as special events, stadiums, or swimming pools can be controlled. It is, however, especially applicable for passenger transportation systems, especially ski lifts, cable railways, and similar installations in a winter sports region. A single data carrier with access authorization is particularly useful in a winter sports region where there is a multiplicity of such passenger transportation systems. The access authorization readers on the access control devices for individual ski lifts, cog railways, and similar passenger transportation systems are connected to a central database, in which, for every assess, the identification details of the particular data carrier and any additional access information, such as the time of the access and the data for identification of the respective access control device, are stored.

according to the invention, a camera is located at the access point, especially in the access lane leading to the turnstile or similar access control device, by means of which, upon access, a picture, preferably a head-and-shoulders portrait of the user of the data carrier, is taken and stored in digitized form in the data base.

The camera can be, e.g., a simple Webcam that, for example, can be incorporated into the housing of the access authorization reader. The housing need only have a small opening for the lens, so that the camera is practically invisible. The camera is preferably actuated by the access authorization reader when it is reading the data carrier.

The actuation of the camera and storage of the picture can take place upon every access. In order to minimize the number of pictures taken and stored in the database without appreciably reducing control effectiveness, a selection program is preferably provided.

Hence, only the pictures of users of the higher-valued data carriers can be selected—only those with week or season passes, for instance.

Moreover, since the access data for the respective data carriers are stored in the database, it is also possible to conduct an analysis of the user's behavior patterns, especially with respect to access times, and based upon that to select which pictures to take and store.

A typical misuse of a data carrier with non-transferable access authorization, e.g. a day pass for winter sports, is characterized in that the first user, who has bought the pass early in the morning, travels to the higher elevations by means of a ski lift, cog railway, or similar means, spends the morning there, and around midday returns to the valley in order to hand on the ticket to someone else, e.g. in the parking lot. When the database detects this type of behavior, a picture of the user can be taken by the camera at the access control point in the valley and stored in the database. This can then be compared with a previously taken photograph, i.e. one taken upon the first use of the data carrier.

With the system according to the invention, it is not legitimate access that is prevented, but rather the misuse of non-transferable access authorization data carriers, unauthorized access may admittedly be initially allowed, but later detected.

Moreover, statistical methods can be used to take pictures of the user of the data carrier and store them in the database. For example, the AQUL (Acceptable Quality Level) spot-check system, an international quality control system, can be utilized to select pictures of the user, which, upon a satisfactory spot check, can be marked on their upper edge to indicate an acceptable average level of authenticity.

Additionally, in order to reduce the amount of data that has to be stored in the database, a computer program can be used that singles out the head of the data carrier user, cuts it out, so to speak, and transmits or stores a digitized image of only the user's head.

The camera can be set to photograph the user during access, upon reading of the data carrier by the reading device, or by the forward motion of the user, as detected by means of sensors.

According to the invention, user photographs stored in the database are accessible via a terminal with a screen operated by the official. The terminal, which is preferably configured as a handheld device, can communicate with the database via a modem if necessary. However, communication between the handheld device and the database is preferably wireless, in particular via GPRS (General Packet Radio Service), UMTS (Universal Mobile Telecommunication System), or another mobile radio technology for rapid data transfer. Communication between the handheld device and the database can also take place over a wireless LAN instead of over the public telecommunications network, access to which should be secure, according to the invention.

To validate the legitimate use of a data carrier, a terminal, preferably portable, in particular a handheld device, first records the data carrier's identification information is expressed as alphanumeric data, the identification details can be keyed in. If the identification details are in the form of a barcode, recorded on a magnetic card or chipcard, stored on the chip of an RFID transponder, or are machine-readable in some other manner, the terminal can instead then be equipped with an appropriate reading device in order to record the identification details.

The identification details recorded in this way are transmitted to the database, preferably by means of wireless transmission, whereupon, if necessary, all pictures stored in the database associated with the identification details can be transmitted back to the terminal, again preferably in a wireless manner.

Using the terminal's screen, the official can visually compare the pictures of the user of the data carrier that have been stored in the database with the person who is currently in possession of the data carrier. The official flips through these pictures at the terminal, so to speak, and by visual comparison can determine whether the pictures on the screen always depict the person he or she is currently checking. The pictures stored in the database can have been taken by a camera at the access control point and/or at another location, e.g. at the ticket booth where the data carrier was purchased. This means that the stored pictures may already have been taken a long time ago, which can be especially relevant for season passes and similar data carriers with longer-term access authorizations.

If the picture on the screen does not match the person currently being checked, appropriate measures can be taken, e.g. the data carrier can be confiscated.

Since other information, such as the history of access dates and times, is preferably also stored in the database along with the pictures and identification details for the data carrier in question, the official can establish, given a lack of agreement of a picture on the screen with the person currently being checked, at which point in time and at which access control point another person began using the data carrier, for example.

According to the invention, a picture can also be taken solely at the access control point by the camera installed there at the time of the first use of the data carrier and stored in the database together with the identification details, and this picture can then be sent to a terminal with a screen for the purposes of making a visual comparison. Therefore, the data carrier can also be bought and provided with the identification details over the Internet.

The reduction to practice of the system according to the invention is explained in more detail below, by way of an example, with the single figure showing a schematic depiction of an embodiment of the invention.

Referring to the single drawing Figure, A turnstile-equipped access control device 1 comprises a turnstile with two rotating blocking arms 3, rotating about an axis 2, and a reading device in a housing 4. Into the card slot 5, equipped with a card-reading device, is inserted a data carrier 8 in the form of card containing a non-transferable access authorization, e.g. a barcode. Upon a successful reading by the reading device of the access authorization information recorded on the data carrier 8, the turnstile rotates, so that the access lane 6 is freed for passage.

When the data carrier 8 is inserted into the card slot 5, a photograph of the user is taken with the camera in the housing 4, of which only the lens 7 is visible. The data carrier is provided with identification details, e.g. "752," which are read by the reading device. These identification details, together with the digitized photograph of the user taken by the camera 7, are stored in a database 9.

The pictures stored in the database 9 are retrievable by an official—whose hand 12 only is shown—by means of a handheld device 11 with a screen 12 and a keypad 13, via a wireless link 14.

To validate the legitimate use of a data carrier, the official 15 obtains the identification details of the person 16 currently being checked, e.g. "752" from the data carrier 8, and inputs it into the handheld device 11 by means of the keypad 13. The identification details are then sent via the wireless link 14 to the database 9, which transmits all the photographs associated with the identification details back to the handheld device 11, where they can by viewed on the screen 12.

The official 15 flips through these pictures and can determine by means of visual comparison whether the pictures consistently show the person 16 who is currently being checked.

The present invention has been described in terms of an exemplary embodiment. It will be understood by those of ordinary skill in the art that various improvements and modifications without departing from the scope and spirit of the present invention.

The invention claimed is:

1. A system for detecting an unauthorized user of a valid data carrier including at least one access control device with a reading device for data carriers upon which identification details are stored for assigned authorized access, and a database in which a photograph of the user of the data carrier, together with the identification details on the data carrier, is stored, wherein at least one camera located at an access control device takes digitized photographs of the users of the access control device that are stored, together with the identification details, in a database, at least one terminal having a screen, communicating with the database, operable by an official so that the identification details on the data carrier are retrievable, and to which the stored photograph of the user of the data carrier taken by the camera during access via the access control device, together with the corresponding identification details, is transmissible for visual comparison with the user of the data carrier being checked, wherein the system permits an unauthorized user to pass through the access control device at least once before a visual comparison to determine if the data carrier is being utilized by the proper user.

2. A system according to claim 1, wherein the stored photograph of the controlled user of the data carrier, taken by the camera during the first use of the data carrier at the access control device and stored in the database for the purposes of visual comparison, is transmissible.

3. A system according to claim 1, wherein the stored photographs of the controlled users of the data carrier taken by the camera during various separate accesses through the access control device are transmissible for purposes of visual comparison.

4. A system according to claim 1, wherein communication between the terminal and the database is made by a wireless link.

5. A system according to claim 4, wherein the communication of data between the terminal and the database is made via GPRS, UMTS, or another mobile wireless technology for the rapid transfer of data.

6. A system according to claim 4, wherein communication between the terminal and the database takes place by a wireless LAN over an internal network.

7. A system according to claim 1, wherein the terminal for inputting the identification details features at least one of a keyboard and a reading device.

8. A system according to claim 1, wherein the terminal comprises a handheld device.

9. A system according to claim 1, wherein a selection of certain said data carriers is made by a selection program, in order to take a photograph of the user entering at the access point with the camera and to store the photograph in the database.

10. A system according to claim 9, wherein the selection of the data carriers by the selection program is based on at least one of their value, on the results of a behavior-pattern analysis of the user of the data carrier, and on statistics.

11. A system according to claim 1, wherein the camera for taking the photograph of the user is actuated by at least one of reading of the data carrier by the reading device, and/or by the forward motion of the user, as detected by sensors.

12. A system for determining the misuse of valid data carries by unauthorized individuals for entry to a controlled area, comprising:

data carriers having identification details for enabling authorized access to a controlled area;

at least one access control device having an access authorization reader for reading data carriers to provide an individual with entry to a controlled area, said access control device for permitting an initial entry to the controlled area without comparison of an image of the individual with a stored photograph;

at least one camera located at an access point at or near the access control device for talking a digitized photograph of a user having a respective data carrier that is entering a controlled area through the access control device;

a database for receiving a photograph from the at least one camera located at the access point and for storing one or more photographs of a user with the identification details of the corresponding data carrier; and a terminal with a display screen for communicating with the database to selectively retrieve identification details and a corresponding photograph to enable an official to visually compare a user of a data carrier with the corresponding one or more photographs, wherein an official determines the use of a data carrier by an unauthorized person, and wherein the at least on camera or another said camera is capable of taking a digitized photograph of a user having a photograph stored in the database and providing a second photograph stored in the database.

13. The system of claim 12, including a plurality of said access control devices having access authorization readers and at least one said camera.

14. The system of claim 12, wherein the terminal comprises a handheld device and communication between the database and the handheld device is made by a wireless link.

15. The system of claim 12, including at least one of the access authorization readers reading the data carrier or a sensor detecting forward motion of a user having the data carrier to take a photograph with the camera.

16. A method for determining the misuse of valid data carriers by unauthorized individuals, comprising the steps of:

providing valid data carriers with corresponding identification details for use by specific authorized persons without obtaining a photograph;

reading a said data carrier with a reading device of an access control device;

providing entry of a person to a controlled area through the access control device when said data carrier provides authorization to the reading device;

after initial entry, subsequently obtaining an initial digital photograph with at least one camera of a person with a data carrier entering a controlled area of the access control device;

storing the digital photograph of the person corresponding to the data carrier in a database;

providing a terminal with a visual screen in communication with the database for use by an official;

after a first entry, upon subsequent entries, selectively retrieving one or more digital photographs and the corresponding identification details for a selected said data carrier from the database, and providing the one or more digital photographs to the terminal for display on the visual screen, whereby an official may visually compare the retrieved one or more digital photographs alone, or with the person utilizing the selected data carrier, to determine if the person is an unauthorized user; and during various entries of the person with a data carrier through the same access control device or another said access control device, selectively repeating the step of obtaining a digital photograph and storing the digital photograph in the database for review to ensure the valid data carrier is not being utilized by different persons.

17. The method of claim 16, wherein, in some instances, the step of selectively retrieving one or more digital photographs comprises providing at least two digital photographs to the terminal for display on the visual screen.

18. The method of claim 16, including the step of, in response to reading the data carrier or sensing forward motion of a user having the data carrier, taking a digital photograph.

19. The method of claim 16, wherein the step of taking a digital photograph comprises only taking a digital photograph when high-value data carriers are detected, and not taking a photograph when a low-value data carrier is detected that provides entry through the access control device.

* * * * *